United States Patent
Sumida

(10) Patent No.: US 6,880,096 B2
(45) Date of Patent: Apr. 12, 2005

(54) METHOD FOR REDUCING POWER CONSUMPTION OF CPU, ELECTRONIC APPARATUS, AND RECORDING MEDIUM HAVING POWER CONSUMPTION REDUCTION PROGRAM RECORDED THEREON

(75) Inventor: Yoshitaka Sumida, Yokkaichi (JP)

(73) Assignee: Sumitomo Wiring Systems, Ltd., Yokkaichi (JP)

( * ) Notice: Subject to any disclaimer, the term of this patent is extended or adjusted under 35 U.S.C. 154(b) by 438 days.

(21) Appl. No.: 10/000,132

(22) Filed: Dec. 4, 2001

(65) Prior Publication Data

US 2002/0078390 A1 Jun. 20, 2002

(30) Foreign Application Priority Data

Dec. 14, 2000 (JP) ........................................ 2000-379565

(51) Int. Cl.[7] .............................................. G06F 19/00
(52) U.S. Cl. ...................... 713/320; 713/323; 713/340; 455/343.1; 379/413; 307/9.1; 307/10.1; 701/36
(58) Field of Search ................................. 713/320, 323, 713/340; 379/413; 455/574, 343.1; 307/9.1, 10.1; 701/36

(56) References Cited

U.S. PATENT DOCUMENTS

| | | |
|---|---|---|
| 5,175,845 A | 12/1992 | Little |
| 5,696,979 A | 12/1997 | Saitou |
| 5,744,874 A | 4/1998 | Yoshida et al. |
| 6,100,814 A * | 8/2000 | Doyle .................... 340/825.69 |
| 6,198,820 B1 * | 3/2001 | Tetsushi ..................... 379/413 |
| 6,198,995 B1 * | 3/2001 | Settles et al. .................. 701/29 |
| 6,236,850 B1 * | 5/2001 | Desai ...................... 455/343.2 |
| 6,282,668 B1 * | 8/2001 | Neudecker .................. 713/324 |
| 6,323,566 B1 * | 11/2001 | Meier ........................ 307/10.2 |
| 6,412,207 B1 * | 7/2002 | Crye et al. ................. 42/70.06 |
| 6,499,811 B2 * | 12/2002 | Kumabe et al. .............. 303/20 |
| RE38,338 E * | 12/2003 | Yoshida et al. ............ 307/10.2 |
| 6,804,591 B1 * | 10/2004 | Miyazawa .................. 701/36 |

FOREIGN PATENT DOCUMENTS

JP          8-263326          10/1996

* cited by examiner

*Primary Examiner*—A. Elamin
(74) *Attorney, Agent, or Firm*—Greenblum & Bernstein, P.L.C.

(57) ABSTRACT

Method and apparatus for reducing electrical power consumption of an electronic unit provided with a central processing unit (CPU). The CPU is returned to a normal operation state at regular intervals when the CPU has been placed in a sleep state. The CPU outputs a clear signal to a monitoring circuit, and makes reference to an actuation signal for an external device, such as, for example, a motor from a control switch to place the CPU in the sleep state at a time other than a time when reference is made to the clear signal and the input signal. When the CPU has been released from the sleep state, reference to an output of the clear signal and the input signal and an output of only the clear signal are repeated at regular intervals and at a predetermined frequency.

14 Claims, 5 Drawing Sheets

METHOD FOR REDUCING POWER CONSUMPTION OF CPU, ELECTRONIC APPARATUS, AND RECORDING MEDIUM HAVING POWER CONSUMPTION REDUCTION PROGRAM RECORDED THEREON

BACKGROUND OF THE INVENTION

1. Field of the Invention

The present invention pertains to a method and apparatus for reducing a power consumption of a central processing unit (CPU) of an electronic unit by switching the CPU between a normal operating state and a sleep state, and more particularly, to returning the CPU to the normal operation state at regular intervals when the CPU has been placed into the sleep state, outputting a predetermined clear signal from the CPU to a monitoring circuit so that the monitoring circuit monitors the state of the CPU, and making reference to an input signal to the CPU from electronic equipment connected to the CPU, and a recording medium having a power consumption reduction program recorded thereon.

2. Discussion of Background and Relevant Information

In recent years, electronic devices are being increasingly designed into, for example, vehicles. Certain electrical devices must remain connected to an electrical power supply (e.g. vehicle battery) even when the vehicle is parked. Thus, such electronic devices consume significant amounts of electrical power twenty-four hours a day. As a result, if the vehicle is parked for an extended period of time, the vehicle battery may be prematurely run down (exhausted). Accordingly, it is desirable to reduce the electrical demands (i.e., energy demand) of the electronic devices when the vehicle is parked. One way to reduce the electrical requirements of such an electronic device (unit) is to place the electronic device into a sleep state when the vehicle is parked.

A microcomputer (e.g., an electronic device containing a CPU) can be used to control and/or operate and/or monitor a plurality of functions. Thus, it is desirable to include a monitoring circuit, such as, for example, a watch dog time (or the like) in the electronic device, in order to return the electronic device to its normal operation state when, for example, the vehicle is to be started (or runs), or a vehicle malfunction or unusual event occurs. If the CPU outputs clear signals to the monitoring circuit at predetermined time intervals, the monitoring circuit concludes that the CPU is in a normal operation state. On the other hand, if the monitoring circuit does not receive the clear signal within the predetermined time interval, the monitoring circuit concludes that the CPU has "locked up" or some other problem has occurred, and the monitoring circuit outputs a reset signal to the CPU. Upon receipt of the reset signal, the CPU is initialized and, hopefully, returns to an initial operation state.

When the CPU is placed into the sleep state, the CPU must be returned to its normal operation state at predetermined intervals in order to ensure that the CPU outputs the clear signal for detection by the monitoring circuit. That is, the microcomputer must be constructed so as to prevent the CPU from going into a runaway state.

When a signal is inputted to the CPU, it is necessary for the CPU to immediately perform the required task, even when the CPU is placed in the sleep state. Therefore, it is necessary to determine whether an actuation signal has been inputted to an input port of the CPU. When the CPU is normally placed in the sleep state, the CPU outputs the clear signal according to a procedure shown in a timing chart of FIG. 5, and the flowchart of FIG. 6.

As shown in FIG. 5, after the CPU enters the sleep state, it returns to the normal operation state for a 10 msec period every 30 msec. The CPU outputs the clear signal and makes reference to the input port thereof. Then, the CPU is placed back into to the sleep state (steps S21–S23 of FIG. 6). Thus, the CPU is in the sleep mode for a 20 msec time period of each 30 msec time period, during which time the electrical consumption of the electrical device is reduced.

According to a conventional method for reducing electrical power consumption of the CPU, it is necessary for the CPU to output the clear signal to the monitoring circuit and to make reference to the input port thereof. Thus, it is necessary for the CPU to return to the normal operation state from the sleep state each time the clear signal is outputted to the monitoring circuit, and to make reference to the input port thereof. However, the electrical power consumed by the CPU during the transition from the sleep state to the normal operation state causes the battery to become discharged in a short period of time.

An apparatus for reducing the electrical power consumption of a CPU is disclosed in Japanese Patent Laid-Open Application No. HEI 8-263326. This apparatus has a first abnormality detection circuit that outputs a first abnormality detection signal to detect an abnormality of the CPU at regular time intervals when the CPU is placed in the sleep state, and a second abnormality detection circuit that outputs a second abnormality detection signal to detect an abnormality of the CPU at regular time intervals when the CPU is in the normal operating state. The time period required to output the second abnormality detection signal is set to be shorter than the time period required to output the first abnormality detection signal, in order to reduce the electrical power consumption of the CPU in the sleep state.

A disadvantage of this apparatus is that it requires that the two abnormality detection circuits generate the different period abnormality detection signals in the sleep state and the normal state. Thus, the construction of the monitoring circuit is complicated and expensive. Further, the interval at which the reference is made to the input port of the CPU is long. Thus, the abnormality detection circuits are incapable of making a fast response to the actuation of the electronic equipment, which makes an operator feel uncomfortable.

SUMMARY OF THE INVENTION

Accordingly, it is an object of the present invention to provide an apparatus and method for reducing the electrical power consumption of a CPU of an electronic device (unit) making reference to an output of a clear signal that is used to detect an abnormality of the CPU and to an input signal transmitted to the CPU, and a recording medium that has a power consumption reduction program recorded thereon.

In order to achieve the above object, according to a first embodiment of the present invention, there is provided a method for reducing the electrical power consumption (requirements) of a CPU by returning the CPU to a normal operation state at regular time intervals when the CPU is placed in a sleep state, outputting an abnormality detection clear signal from the CPU to a monitoring circuit, and making reference to an input signal transmitted from outside the CPU to place the CPU in the sleep state at a time other than a time when reference is made to the clear signal and the input signal. When the CPU has returned to the normal operation state from the sleep state, reference to an output of the clear signal and the input signal and an output of only the clear signal are repeated at regular intervals and at a predetermined frequency.

According to a feature of the present invention, a frequency of an output of only the clear signal is set to be more than that of the reference to an output of the clear signal and the input signal.

According to another object of the present invention, there is provided an electronic apparatus that employs a CPU, in which the electrical power requirements are reduced by returning the CPU to a normal operation state at regular intervals when the CPU is placed in a sleep state, outputting an abnormality detection clear signal from the CPU to a monitoring circuit, and making reference to an input signal transmitted to the CPU to thereby place the CPU in the sleep state at a time other than a time when reference is made to the clear signal and the input signal.

When the CPU returns to the normal operation state from the sleep state, a signal generation device repeats reference to an output of the clear signal and the input signal and an output of only the clear signal at regular time intervals and at a predetermined frequency.

Another advantage of the present invention is that a signal generation device is constructed to set the output frequency of only the clear signal to be more than that of the reference to an output of the clear signal and the input signal.

According to a still further object of the present invention, there is provided a recording medium (storage device) that stores a power consumption reduction program that is executed by a CPU, in which the power consumption program includes a first task, a second task, and a third task. The first task returns the CPU to a normal operation state at regular time intervals when the CPU is placed in a sleep state and outputs an abnormality detection clear signal from the CPU to a monitoring circuit. The second task makes reference to an input signal transmitted from outside to the CPU to place the CPU in the sleep state at a time other than a time when reference is made to the clear signal and the input signal after the clear signal is outputted from the monitoring circuit. The third task repeatedly makes reference to an output of the clear signal and the input signal and an output of only the clear signal at regular intervals and at a predetermined frequency, when the CPU has returned to a normal operation state from the sleep state.

According to a feature of the invention, the third task is so constructed as to set the frequency of an output of only the clear signal to be greater than that of the reference to an output of the clear signal and the input signal.

It is noted that the reference to the output of the clear signal and the input signal and the output of only the clear signal are repeated at predetermined intervals and at a predetermined frequency. Therefore, it is possible to make the reference to the output of the clear signal for detecting an abnormality of the CPU and the input signal transmitted to the CPU from outside and reduce the time period required for the CPU to go to the normal operation state from the sleep state. Therefore, the amount of electrical power consumed by the electronic device is reduced.

Further, the above-described control can be made by altering the program without changing the construction of the CPU. Thus, it is possible to minimize the cost for manufacturing the electronic unit.

It is also possible to secure reference to the input signal to the CPU. Thus, it is possible to immediately actuate the CPU.

According to another object, a method is disclosed for reducing an amount of electrical power consumed by an electronic unit. A CPU associated with the electronic unit is placed into a sleep state upon an occurrence of a predetermined event, such as, but not limited to, for example, the parking of a vehicle. The CPU is then periodically returned to a normal operation state for a predetermined period of time, so that it can be determined whether the electronic unit is to perform a predetermined task, such as, but not limited to, operating a power window of the vehicle.

According to a feature of the invention, reference is made to an input signal transmitted from an external device to the CPU to place the CPU in the sleep state at a time other than a time when reference is made to a clear signal and the input signal, wherein reference is made to an output of the clear signal and the input signal, and to an output of only the clear signal, are repeated at regular intervals and at a predetermined frequency when the CPU has returned to the normal operation state from the sleep state. The clear signal is output to, for example, a monitoring device.

According to an advantage of the invention, the predetermined frequency of the output of only the clear signal is set to be greater than the predetermined frequency of the reference to the output of the clear signal and the input signal.

According to another advantage, a period for reference to the input signal is made longer than a period required for the output of the clear signal. A predetermined ratio is set for a frequency of the reference to the output of the clear signal and the input signal to a frequency of the output of only the clear signal. The predetermined ratio is set to be greater than 0 and less than 1, such as, but not limited to, for example, ½.

BRIEF DESCRIPTION OF THE DRAWINGS

The foregoing and other objects, features, and advantages of the invention will be apparent from the following more particular description of the preferred embodiment as illustrated in the accompanying drawings, in which reference characters refer to the same parts throughout the various views, and wherein.

DESCRIPTION OF THE PREFERRED EMBODIMENTS

A preferred embodiment of the present invention will be described below with reference to the drawings.

FIGS. 1 to 4 illustrate an apparatus and method for reducing the electrical power requirement (consumption) of a CPU, along with a recording medium that stores a power consumption reduction program.

Figure 1:
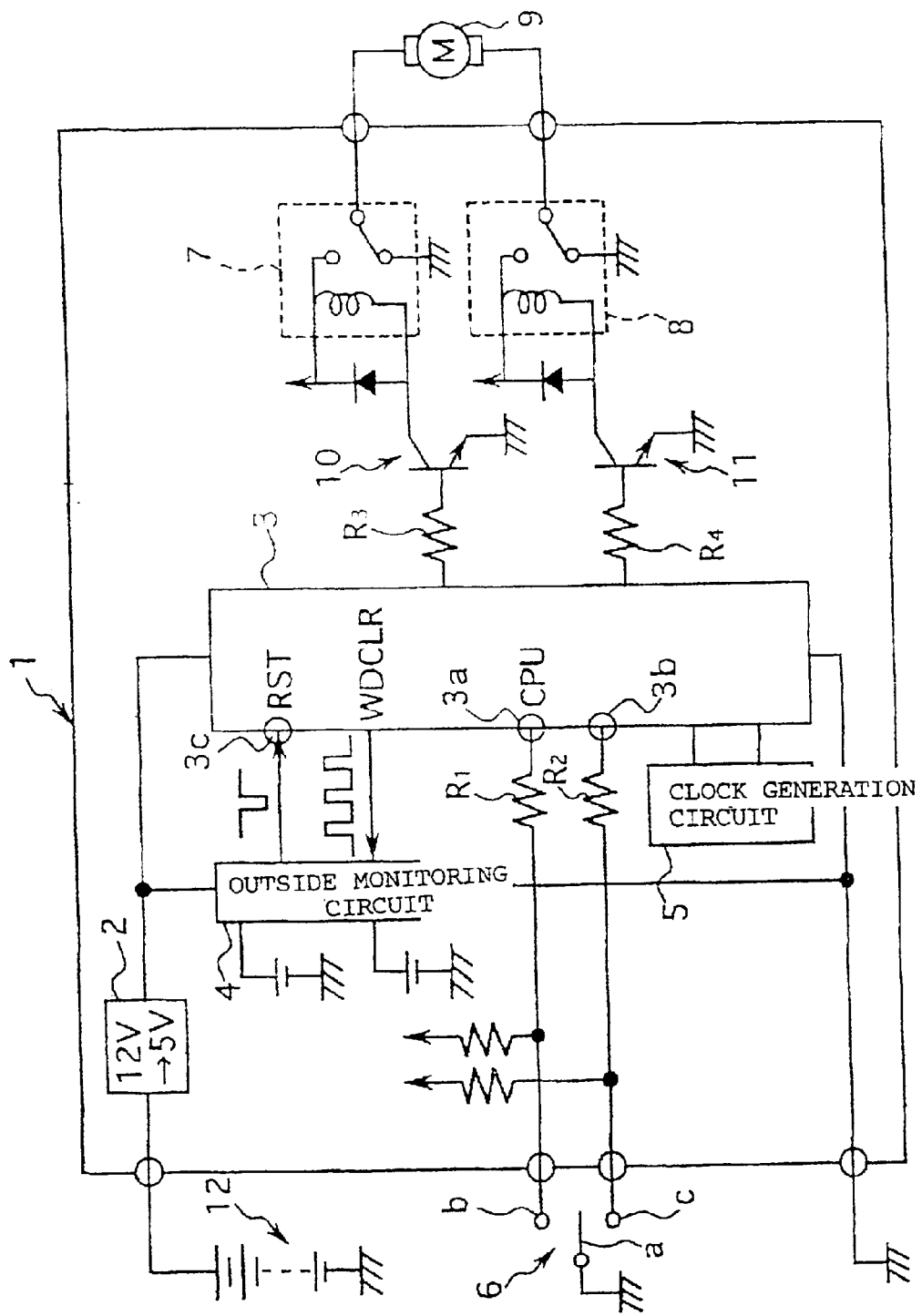
FIG. 1 illustrates an example of a power consumption reducing circuit of the present invention.

The construction of the preferred embodiment will now be described. FIG. 1 illustrates an electronic unit 1 that serves as an electronic apparatus that controls a power window of a vehicle. The electronic unit 1 comprises a voltage reducer 2; a CPU 3; a monitoring circuit 4; a clock generator 5; a first relay 7; a second relay 8; a first switching device 10, such as, for example, a transistor; a second switching device 11, such as, for example, a transistor; and protectors R1 to R4.

A positive terminal of an electrical power source, such as, for example, a vehicle battery 12 is connected to an input of the voltage reducer 2. In the disclosed embodiment, the vehicle battery 12 is, for example, a 12 volt automobile battery, and the voltage reducer 2 is, for example, a voltage regulator that provides a constant 5 volt output voltage. However, it is understood that the electronic unit 1 can be designed to operate on alternative power sources, and other output voltages, and that, further, alternative voltage regulators/voltage reducing devices, such as, but not limited to, for example, a zener diode, a constant current diode, resistor that operates as a voltage regulating device, can be employed without departing from the scope and/or spirit of the invention.

The output of the voltage reducer 2 is supplied to voltage supply terminals (not labeled) of the CPU 3 and the monitoring circuit 4, respectively. In the disclosed embodiment, a first output port (not labeled) of the CPU 3 is connected to the base of transistor 10 via the protector R3, which may be, for example, a protective resistor. The emitter of transistor 10 is grounded, while the collector of transistor 10 is connected to a coil (not labeled) of the relay 7. Similarly, a second output port (not labeled) of the CPU 3 is connected to the base of transistor 11 via the protector R4, which may be, for example, a protective resistor. The emitter of transistor 11 is grounded, while the collector of transistor 11 is connected to a coil (not labeled) of the relay 8. A motor 9, such as, for example, a power window motor, is connected accross switching terminals of the relays 7 and 8.

A controlling device 6, such as, for example, a switch, is connected to input ports 3a and 3b of the CPU 3. In the disclosed embodiment, the switch 6 is, for example, a single pole, double throw (SPDT) switch, that selects whether the vehicle window is to be opened or closed; however, the invention is not limited to this specific construction, and alternative controlling devices may be utilized by the present invention. A first terminal b of the switch 6 is connected to the input port 3a of the CPU 3 via protector R1, which may be, for example, a protective resistor, while a second terminal c is connected to the input port 3b of the CPU 3 via protector R2, such as, for example, a protective resistor. The desired window operation (e.g., opening or closing of the window) is selected by selectively connecting terminal b or c to ground via contact a of the switch 6.

The monitoring circuit 4 is connected to an input port 3c of the the CPU3 to receive a reset signal RST issued by the monitoring circuit 4. The CPU 3 outputs a clear signal WDCLR to the monitoring circuit 4 at regular intervals, based on pulse signals generated by the clock generation circuit 5. If the clear signal is not inputted to the monitoring circuit 4 within a predetermined period of time, it is concluded that the CPU 3 has entered into a run-away state or a problem (trouble) has occurred, and the reset signal (RST signal) is outputted from the monitoring circuit 4 to the CPU 3. Upon receipt of the reset signal, the CPU 3 is initialized and returns to an initial operation state.

It is noted that the predetermined period of time of the clear signal, and the pulse width of the reset signal can be arbitrarily set by, for example, varying a capacitor and/or resistor of an RC circuit associated with the monitoring circuit 4.

When contact a of switch 6 engages terminal b (or terminal c) of the switch 6, the CPU 3 applies a voltage to the base of transistor 10 (or transistor 11). As a result, relay 7 (or relay 8) is turned ON to drive the motor 9 in a first direction (or a second direction), to thereby move the window upward (or downward).

The CPU 3 monitors input ports 3a, 3b and 3c to determine whether an actuation signal of the motor 9 has been inputted to one of the input ports 3a and 3b via the switch 6 and whether the reset signal has been inputted to the input port 3c by the monitoring circuit 4.

When the CPU 3 is placed into a sleep state, the CPU 3 returns to the normal operation state at regular (periodic) time intervals to make reference to the output of the clear signal and an input signal. The reference to the output of the clear signal and the input signal is made arbitrarily at a frequency set by a low-power mode of a software routine of the present invention, to be described below.

Figure 2:
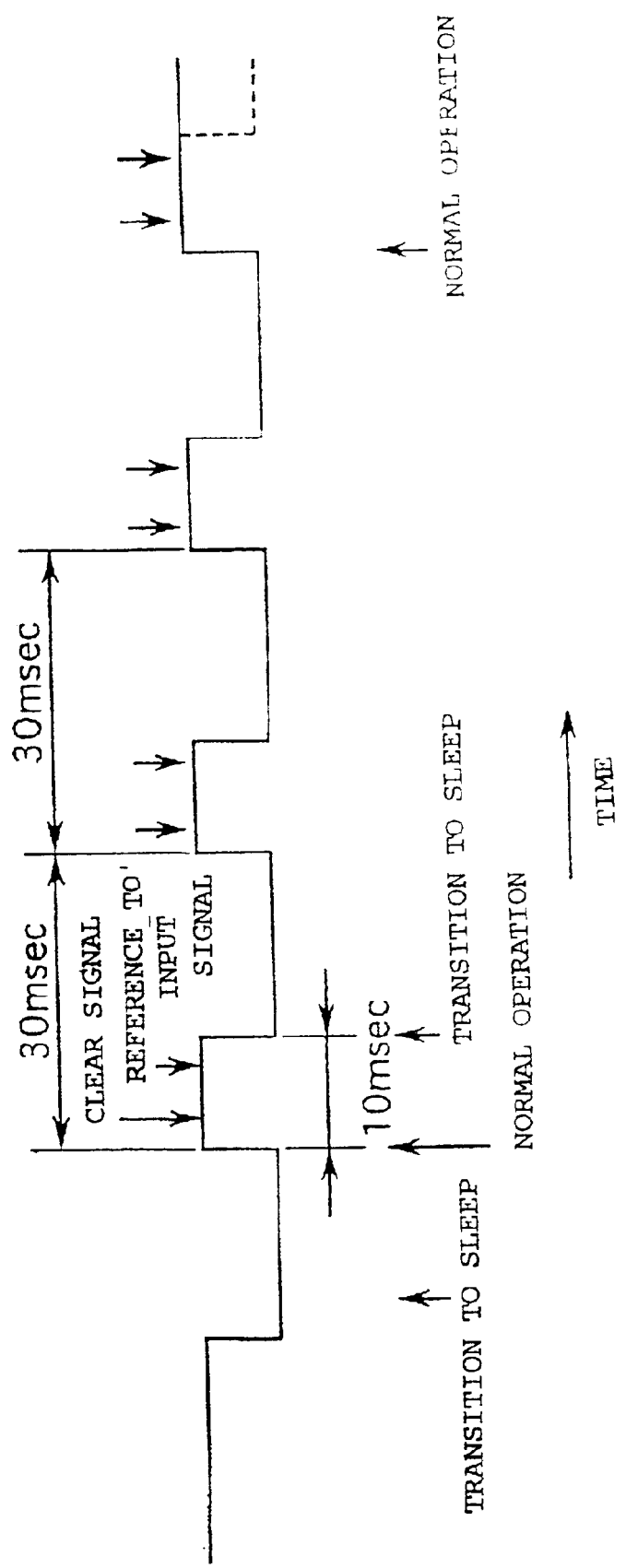
FIG. 2 illustrates a timing chart of a processing signal in a low-power mode according to the embodiment of FIG. 1.

As shown by the timing diagram of FIG. 2, after CPU 3 is placed in the sleep state, the CPU 3 returns to the normal operation state for 10 msec during each 30 msec time period. Immediately after the CPU 3 returns to the normal operation state, reference is made for the presence of the clear signal and the input signal. Thereafter, the CPU 3 returns to the sleep state for a 20 msec time period. Upon the expiration of 20 msec time period, the CPU returns to the normal operation state for a time period of 2 msec, during which time the CPU 3 outputs the clear signal WDCLR.

After the clear signal is issued, the CPU 3 returns to the sleep state for the remainder of the 30 msec time period (e.g., for a time period of 28 msec). Upon the expiration of the 28 msec time period, the CPU 3 returns to the normal operation state for a 2 msec time period. The above-described mode is repeated twice. Thereafter, the above-described mode is switched to a mode in which reference to the output of the clear signal and the input signal is made within a 10 msec time period, after which, a mode in which only the clear signal is outputted is twice executed.

In the disclosed embodiment, 2 msec is set for the output of the clear signal, and 8 msec is set for the reference to the input signal. However, it is understood that these time periods, as well as the above-discussed time periods, may be varied without departing from the spirit and/or scope of the invention. That is, the disclosed time periods are not absolute time periods, but are merely examples of time periods that may be used to practice the present invention.

The CPU 3 executes a plurality of programs (referred to, hereinafter, as a first program, a second program, and a third program) that are (have been) recorded to a recording medium (storage device), such as, but not limited to, for example, a RAM, a ROM, a CD-ROM (that is read by, for example, a CD-ROM drive), a floppy disk (that is read by, for example, a disk drive), a DVD (that is read by, for example, a DVD drive), a hard disk, a flash memory, a memory cartridge, and the like. In this regard, it is understood that the programs of the present invention may be stored in (with) any type of storage device that is capable of storing information.

In the disclosed invention, the CPU 3 includes a read only memory (ROM) therein (not labelled) that stores the routines to be described below. However, it is understood that an external ROM that is interfaced to the CPU may be substituted in place of the disclosed CPU that contains a built-in ROM. Furthermore, random access memory (RAM) that is either built into the CPU or is external of the CPU may be used in place of the ROM, and/or an interface may be provided that enables connection of, for example, the CD-ROM drive, the DVD drive, the floppy drive, the hard disk, the flash memory, the memory cartridge, and the like to the CPU.

The CPU 3 of the disclosed embodiment includes a signal generation device. However, it is understood that the signal generation device can be external to the CPU 3 without departing from the spirit and/or scope of the invention.

The operation will now be described below with reference to FIGS. 3 and 4.

Figure 3:
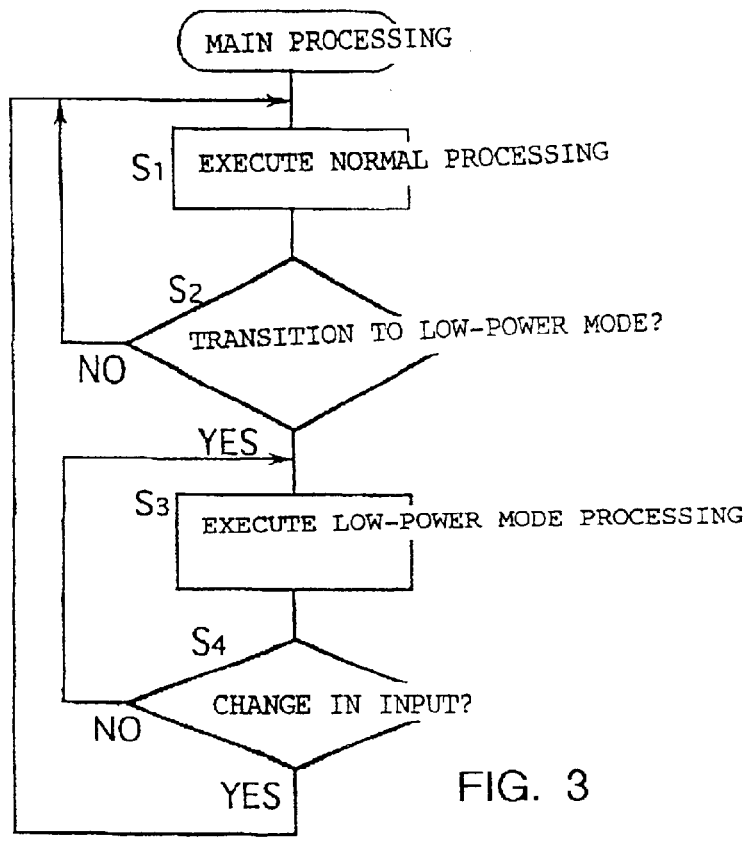
FIG. 3 illustrates a flowchart of a main process executed by a central processing unit (CPU) in accordance with the embodiment of FIG. 1.

FIG. 3 illustrates an example of the main processing routine that is executed when the CPU 3 is in the normal operation state. FIG. 4 illustrates an example of a low-power mode processing routine that is executed by the CPU 3 when it is placed in the sleep state. In this regard, it is understood that the illustrated flowcharts are just examples, and that alternative routines (programs) that achieve substantially the same result may be designed without departing from the scope and/or spirit of the invention.

In this regard, it is noted that all time periods mentioned herein are merely examples, and the disclosed time periods may be varied without departing from the scope and/or spirit of the present invention. As long as the CPU 3 is placed in the sleep mode for any period of time, a reduction in the amount of electrical power consumed by the electronic unit 1 will be achieved.

With reference to FIG. 3, when the CPU 3 is running in the normal operation state, processing a normal process (e.g., first task) for opening and closing the vehicle window and the output of the clear signal are executed at step S1. Thereafter, at step S2, it is determined whether the CPU has been placed into the low-power mode, such as occurs, for example, when the vehicle is parked. If the CPU 3 has been instructed to enter the sleep mode, step S3 is executed to perform a low-power mode process, to be described below. However, if the CPU 3 has not been placed in the sleep mode, processing returns to step S1 to perform the normal process.

After step S3 is executed, processing proceeds to step S4 to determine whether a change in input has occurred in the processing for the low-power mode. That is, it is determined whether switch 6 has been operated, or whether the reset signal has been inputted to the CPU 3. If the determination is negative, processing returns to step S3 to execute the low-powere routine. If the determination is affirmative, processing returns to step S1 to execute the normal processing routine.

Figure 4:
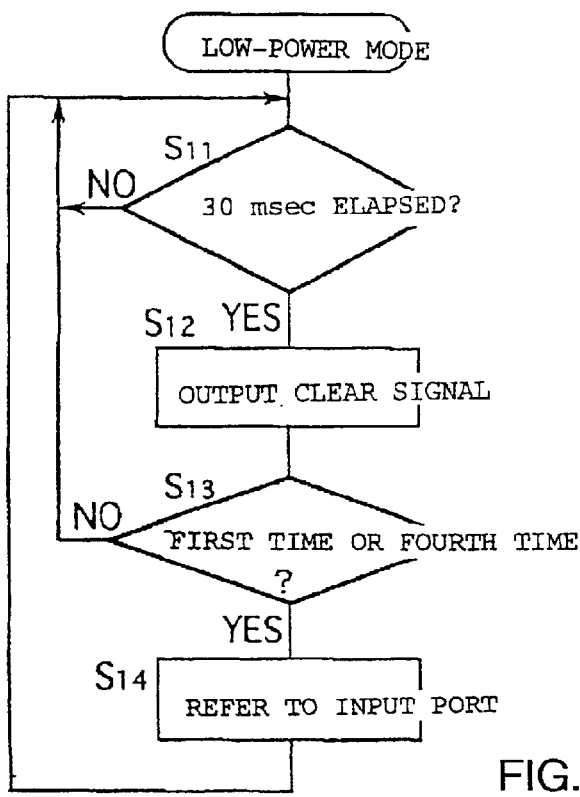
FIG. 4 illustrates a flowchart of a low-power mode according to the embodiment of FIG. 1.
Figure 5:
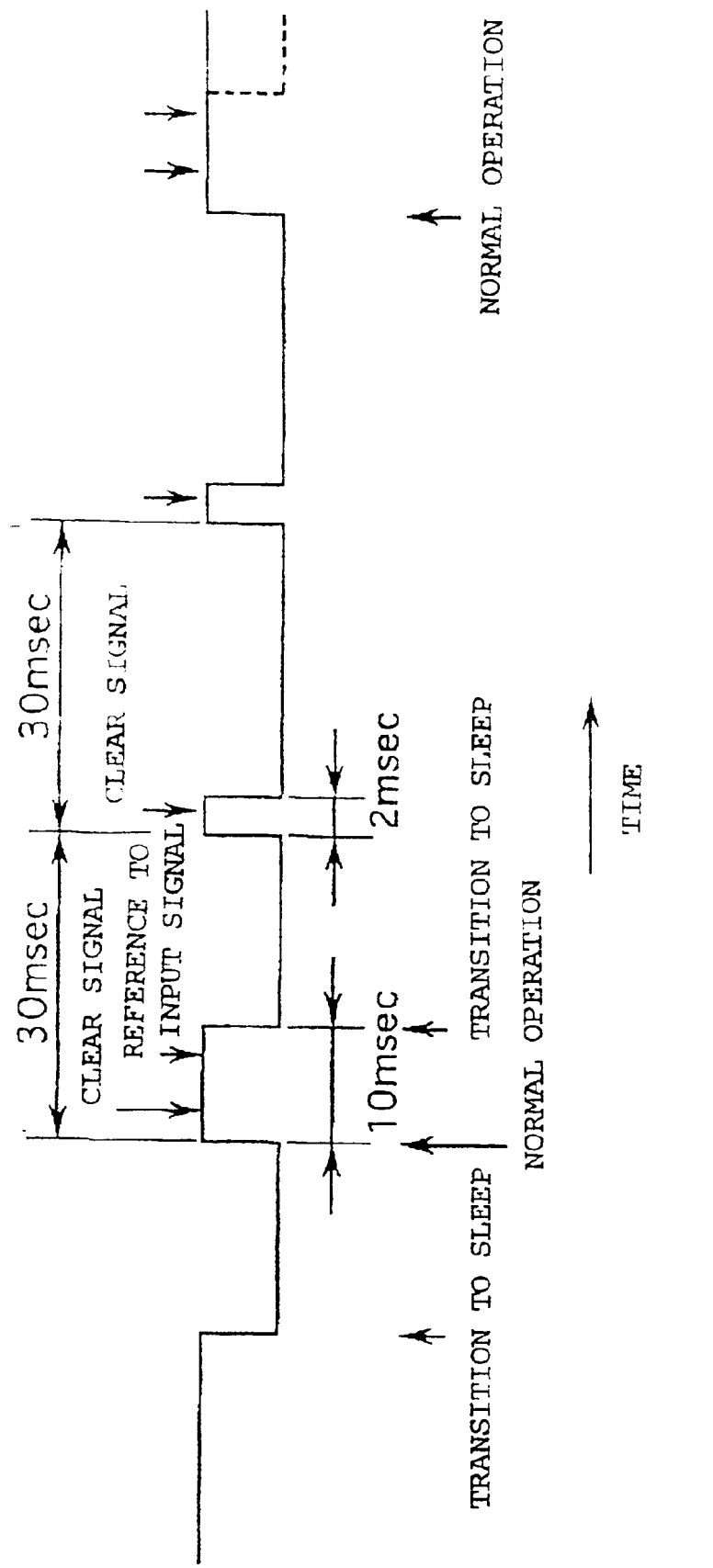
FIG. 5 illustrates the timing of a processing signal in a conventional low-power mode.
Figure 6:
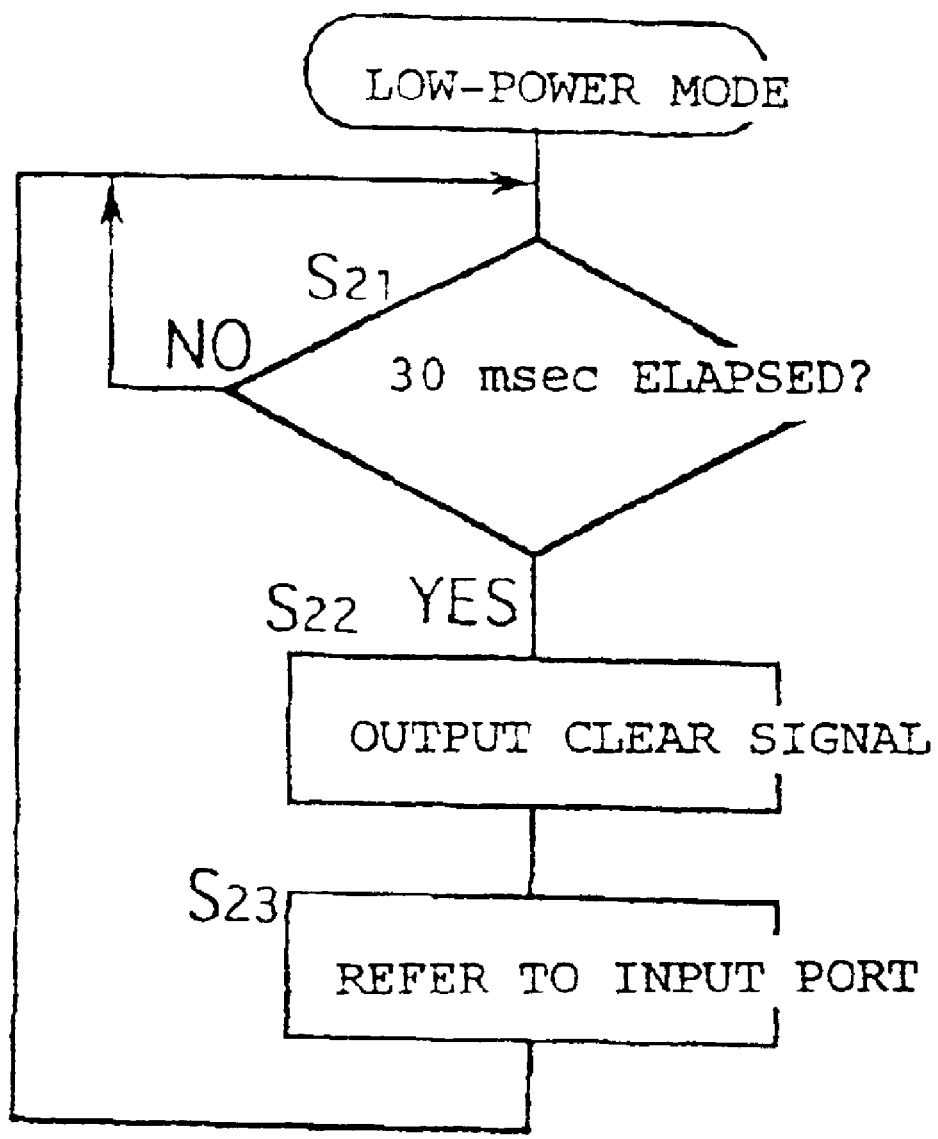
FIG. 6 illustrates a flowchart of the conventional low-power mode of FIG. 5.

In the low-power mode, shown in FIG. 4, a determination is made as to whether a certain (e.g., 30 msec) time period has elapsed from when the CPU 3 entered the sleep state (step S11). If the determination is negative, processing returns to step S11.

If the determination is affirmative, processing proceeds to step S12 to output a clear signal. Then, it is determined at step S13 whether a predetermined number of processings (such as, but not limited to, for example, a first or a fourth processing) for returning the CPU 3 to the normal operation state has been executed. In this case, it is determined that the first processing has been executed because the determination is made immediately after the CPU 3 goes into the sleep state. Then, reference is made as to whether an actuation signal has been input to the input ports 3a to 3c (step S14). However, if the determination at step S13 is negative, processing returns to step S11.

After the processing of step S14 is completed, processing returns to step S1 to determine whether another certain (30 msec) time period has elapsed. If another 30 msec time period has elapsed (e.g., the determination is positive), the CPU 3 outputs the clear signal (step 12), and determines whether first or fourth processing for returning the CPU 3 to the normal state has been executed (step S13). Since this loop is the second processing time that the CPU 3 has been returned to the normal operation state, processing returns to step S11 without making reference to the input signal.

When the program determines that another 30 msec time period has elapsed at S11, the CPU 3 outputs the clear signal (step 12), and, once again, it is determined whether a first or a fourth processing for returning the CPU 3 to the normal state has been executed (step S13). This time, it is determined that a third return of the CPU 3 to the normal state has been executed, and thus, processing returns to step S11 without making reference to the input signal (that is, step S14 is not performed).

After the 30 msec time period has elapsed for the fourth time and the CPU 3 has output the clear signal (steps S11 and S12), it is determined at step S13 (for the fourth time) whether a first or a fourth processing for returning the CPU 3 to the normal operation state. As step S13 is executed for the fourth time, the determination is affirmative, and thus, processing proceeds to step S14, to determine whether an actuation signal has been inputted to the input ports 3a to 3c.

As described above, the reference to the output of the clear signal and the input signal and the output of only the clear signal are repeated at predetermined intervals and at a predetermined frequency. Therefore, it is possible to easily make reference to the output of the clear signal for detecting an abnormality of the CPU 3 and the input signal transmitted to the CPU 3 from outside. It is also possible to reduce (or vary) the time period required for the CPU to go to the normal operation state from the sleep state. Therefore, the power consumption of the electronic device unit 1 is significantly reduced.

Since the programs are stored in a recording medium, they can be easily altered without having to change (revise) the construction of the electronic unit 1, and in particular, the CPU 3. Thus, it is possible to minimize (or prevent) increases in the cost of manufacturing the electronic unit 1 when the programming is modified.

The reason the output of only the clear signal is executed when the CPU 3 returns to the normal operation state from the sleep state is because attention is paid to the fact that the period of time required to make the reference to the input signal is longer than the period of time required for the output of the clear signal. In the disclosed embodiment, a ratio of a frequency of the reference to an output of the clear signal and the input signal to a frequency of the output of only the clear signal is set to be equal to approximately ½. Therefore, the power consumption can be significantly reduced. As noted above, it is understood that ratios other than ½ (e.g., a ratio greater than 0 but less than 1) may be substituted without departing from the scope and/or spirit of the invention.

In addition, as described above, the frequency of the output of only the clear signal is set to be more than that of the reference to the output of the clear signal and the input signal. Thus, the operation of the CPU 3 can always be monitored, which minimizes the possibility of intereference.

The frequency of the reference to the output of the clear signal and the input signal and the set time periods can be set according to a specification required by a system. Preferably, the number of processing times required for recognizing the input of the actuation signal is so set as to not make an operator of the switch 6 feel that an inordinate delay occurs between the time the switch 6 is operated until the time the motor 9 operates to open (or close) the vehicle window.

According to the present invention, reference to the output of the clear signal and the input signal and the output of only the clear signal are repeated at predetermined intervals and at a predetermined frequency. Therefore, it is possible to make the reference to the output of the clear signal for detecting an abnormality of the CPU 3 and the input signal transmitted to the CPU 3 from outside minimal, and to reduce the time period required for the CPU to go to the normal operation state (mode) from the sleep state. Therefore, the power consumption of the electronic unit 1 can be reduced.

In addition, the frequency of the output of only the clear signal is set to be greater than that of the reference to the output of the clear signal and the input signal. Thus, the operation of the CPU 3 can always be monitored, which reduces the risk of interference.

While the invention has been particularly shown and described with reference to the preferred embodiments thereof, it is understood by those skilled in the art that various alterations in form and/or detail may be made without departing from the spirit and/or scope of the invention, as defined by the following claims. Although the invention has been described with reference to the particular means, materials and embodiments, it is to be understood that the invention is not limited to the particulars disclosed herein, but extends to all equivalents within the scope of the claims.

The present disclosure relates to subject matter contained in Japanese Application No. 2000-379565, filed on Dec. 14, 2000, which is expressly incorporated herein, by reference, in its entirety.

What is claimed is:

1. A method for reducing an electrical power consumption of a CPU, comprising:
   returning the CPU to a normal operation state, from a sleep state, at regular intervals when the CPU is placed in the sleep state;
   outputting an abnormality detection clear signal from the CPU to a monitoring circuit; and
   making reference to an input signal transmitted from an external device to the CPU to place the CPU in the sleep state at a time other than a time when reference is made to the clear signal and the input signal, wherein reference to an output of the clear signal and the input signal, and an output of only the clear signal, are repeated at regular intervals and at a predetermined frequency when the CPU has returned to the normal operation state from the sleep state.

2. The method of claim 1, wherein the predetermined frequency of the output of only the clear signal is set to be greater than the predetermined frequency of the reference to the output of the clear signal and the input signal.

3. An electronic apparatus, comprising:
   a CPU that is selectively switched between a normal operation state and a sleep state in which an amount of electrical power consumed by said CPU is reduced, said CPU being returned to the normal operation state at regular intervals when said CPU is placed in said sleep state, said CPU periodically outputting an abnormality detection clear signal to a monitoring circuit and making reference to an input signal transmitted from an external device to said CPU that places said CPU into said sleep state at a time other than when reference is made to said clear signal and said input signal; and
   a signal generation device that references an output of said clear signal and said input signal, and an output of only said clear signal, at regular intervals and at a predetermined frequency when said CPU returns to said normal operation state from said sleep state.

4. The electronic apparatus of claim 3, wherein said signal generation device sets said frequency of said output of only said clear signal to be greater than said frequency of said reference to said output of said clear signal and said input signal.

5. A recording medium, comprising:
   a power consumption reduction program executed by a CPU, said power consumption reduction program including:
   a first task that functions to return said CPU to a normal operation state at regular time intervals when said CPU has been placed into a sleep state, said first task instructing said CPU to output an abnormality detection clear signal to a monitoring device;
   a second task that makes reference to an input signal transmitted from an external device to said CPU to place said CPU in said sleep state at a time other than when reference is made to said clear signal and said input signal, after said clear signal is outputted from said monitoring device; and
   a third task that references an output of said clear signal and said input signal, and an output of only said clear signal, at regular time intervals and at a predetermined frequency when said CPU returns to said normal operation state from said sleep state.

6. The recording medium of claim 5, wherein said third task sets said predetermined frequency of an output of only said clear signal to be greater than said predetermined frequency of said reference to said output of said clear signal and said input signal.

7. The recording medium of claim 5, wherein the recording medium comprises a storage device.

8. A method for reducing an amount of electrical power consumed by an electronic unit, comprising:
   placing a CPU associated with the electronic unit into a sleep state upon an occurrence of a predetermined event;
   periodically returning the CPU to a normal operation state, from the sleep, for a predetermined period of time; and
   determining whether the electronic unit is to perform a predetermined task when the CPU is returned to the normal operation state for the predetermined period of time, wherein the determining comprises making reference to an input signal transmitted from an external device to the CPU to place the CPU in the sleep state at a time other than a time when reference is made to a clear signal and the input signal, wherein reference to an output of the clear signal and the input signal, and reference to an output of only the clear signal, are repeated at regular intervals and at a predetermined frequency when the CPU has returned to the normal operation state from the sleep state.

9. The method of claim 8, further comprising periodically outputting the clear signal from the CPU to a monitoring device.

10. The method of claim 8, further comprising setting the predetermined frequency of the output of only the clear signal to be greater than the predetermined frequency of the reference to the output of the clear signal and the input signal.

11. The method of claim 8, further comprising making a period for reference to the input signal longer than a period required for the output of the clear signal.

12. The method of claim 8, further comprising setting a predetermined ratio for a frequency of the reference to the output of the clear signal and the input signal to a frequency of the output of only the clear signal.

13. The method of claim 12, wherein the predetermined ratio is greater than 0 and less than 1.

14. The method of claim 12, wherein the predetermined ratio is ½.

* * * * *